United States Patent [19]
Fukuma

[11] Patent Number: 4,710,024
[45] Date of Patent: Dec. 1, 1987

[54] SPECTROPHOTOMETER

[75] Inventor: Toshiaki Fukuma, Kyoto, Japan

[73] Assignee: Shimadzu Corporation, Japan

[21] Appl. No.: 881,331

[22] Filed: Jul. 2, 1986

[30] Foreign Application Priority Data

Jul. 2, 1985 [JP] Japan .............................. 60-145377

[51] Int. Cl.⁴ ............................................. G01J 3/42
[52] U.S. Cl. .................................... 356/328; 356/334; 364/498
[58] Field of Search .............. 356/319, 320, 323, 324, 356/325, 326, 328, 331, 332, 334; 364/498

[56] References Cited
U.S. PATENT DOCUMENTS 3,563,656 2/1971 Helms .................................. 356/326
3,843,259 10/1974 Tohyama et al. ................... 356/325

Primary Examiner—F. L. Evans
Assistant Examiner—Frederick Samuels
Attorney, Agent, or Firm—Franklin D. Wolffe; Morris Fidelman

[57] ABSTRACT

A spectrophotometer wherein the diffraction grating is driven directly by a pulse motor and the wavelength of the monochromatic light used for measurement is calculated by a data processor from the amount of rotation of the pulse motor. The data processor is provided with an input unit for setting a parameter corresponding to the difference between the nominal and actual grating constants of the diffraction grating and so arranged as to calculate the wavelength in accordance with the nominal grating constant having been modified with the parameter set through the input unit.

5 Claims, 4 Drawing Figures

SPECTROPHOTOMETER

BACKGROUND OF THE INVENTION

This invention relates to a spectrophotometer of the type that the diffraction grating is driven directly by a motor.

A sine bar mechanism is known as a device to drive a diffraction grating used as dispersing means in a monochromator. This mechanism has an advantage that the amount of rotation of the screw rod for driving the sine bar, that is, the amount of rotation of the motor for driving the screw rod is in a linear relation to the wavelength of the light emerging from the monochromator. The mechanism, however, has a disadvantage that the structure is complicated.

In recent years electronic computers have come to be widely used to control spectrophotometers. In this case the amount of rotation of the motor for driving the diffraction grating is not in a linear relation to the wavelength. However, since the wavelength can be calculated from the amount of rotation of the driving motor, a system for driving the diffraction grating directly by a motor has come to be in increasing use, with an advantage that the mechanical structure is much simplified.

Generally, the grating pitch, that is, the spacing between ruled lines or grooves on the diffracting grating differs more or less from one diffraction grating to another. In those spectrophotometers which employ a sine bar mechanism for driving the diffraction grating, the above-mentioned difference is corrected by adjusting the length of the sine bar so that there is an exact correspondence between the amount of rotation of the motor and the wavelength obtained.

The system for driving the diffraction grating directly by a motor has no such means for mechanically correcting the above-mentioned difference in the grating pitch, so that if the grating pitch of a diffraction grating differs from the design or nominal value, the indication of wavelength contains an error. Thus the spectrophotometers of that type have been evaluated as having a low degree of accuracy in wavelength selection.

SUMMARY OF THE INVENTION

Accordingly, the primary object of the invention is to provide a device for correcting the variation of the grating pitch in different diffraction gratings having the same design or nominal value of the grating pitch for use in a sepctrophotometer of the type that the diffraction grating is driven directly by a motor.

Briefly, the spectrophotometer of the invention is provided with means for calculating the wavelength of the light beam emitted by the monochromator from the amount of rotation of the motor for driving the diffraction grating.

Referring to FIG. 3, suppose that a diffraction grating G is rotatable about an axis perpendicular to the plane of the sheet of paper of the drawing at the origin O of the coordinate system. A light beam $L_I$ incident on the diffraction grating makes an angle $\alpha$ with the Y axis, and the diffracted light $L_D$ from the diffraction grating makes the same angle $\alpha$ with the Y axis on the side opposite to the incident light. When the surface of the diffraction grating coincides with the X axis, the diffracted light that emerges from the monochromator is of the zeroth order, and the position of the diffraction grating corresponds to zero wavelenth. When the diffraction grating is rotated for an angle $\theta$ from the zero wavelength position, the wavelength $\lambda$ of the diffracted light (of the first order only) that emerges out of the monochromator is given as:

$$\lambda = 2d \cos \alpha \sin \theta$$

where d is a grating constant.

In the above expression the angle $\theta$ is proportional to the amount of rotation of the motor, and the grating constant is the inverse of the number N per millimeter of the grooves or lines ruled on the diffraction grating. Let the reduction ratio of the motor be A, and the amount of rotation of the motor be $\phi$. The wavelength of the diffracted light that comes out of the exit slit of the monochromator can be calculated from the amount of rotation of the motor by the following expression:

$$\lambda = \frac{2}{N} \cos \alpha \sin A \phi \tag{1}$$

The instrument of the invention is provided with a circuit for conducting the above calculation, and for the grating pitch N to be set as a parameter in the circuit there are provided 2n+1 different kinds of grating pitches N±n (where n=0, 1, 2 ...), so that by selecting one of the pitches for calibration it is possible to calculate the correct wavelength from the amount of rotation of the motor.

BRIEF DESCRIPTION OF THE DRAWINGS

FIG. 2b is an elevational view of the mechanism shown in FIG. 2a; and

DESCRIPTION OF THE PREFERRED EMBODIMENT

Figure 1:
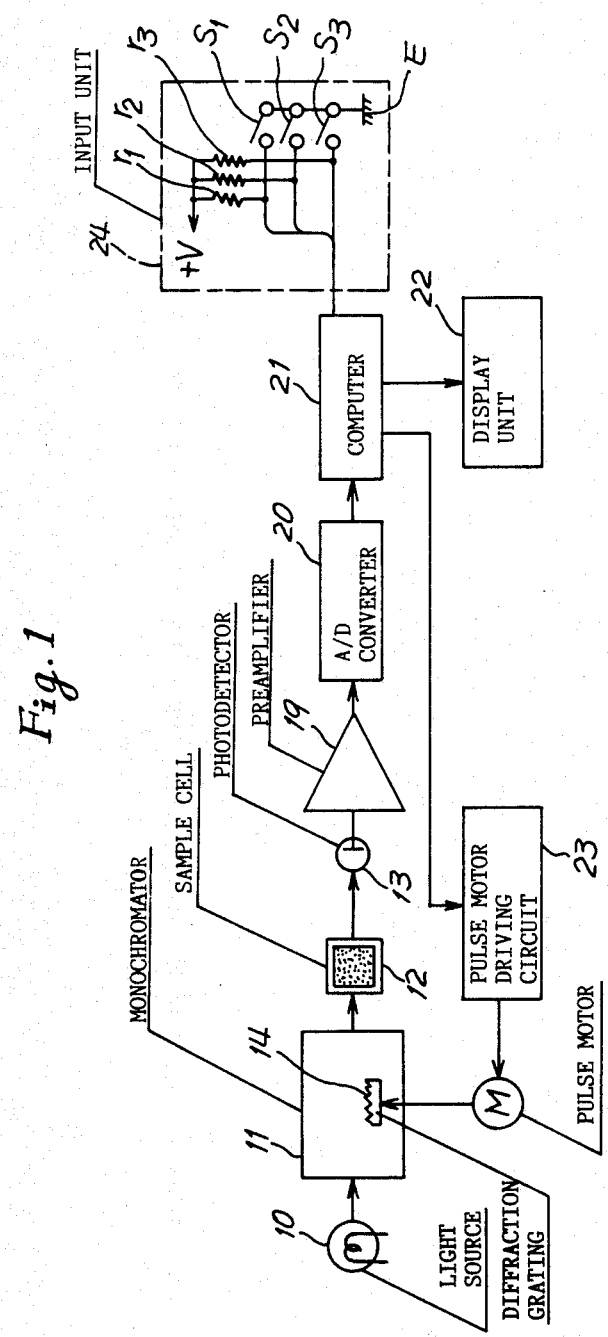
FIG. 1 is a diagram of one embodiment of the invention.

Referring to FIG. 1, there is schematically shown a spectrophotometer comprising a light source 10, a monochromator 11, a sample cell 12 and a photodetector 13. The monochromator 11 includes a diffraction grating 14 which disperses the light from the source 10 into a series of wavelengths. A pulse motor M drives the diffraction grating 14 so that a selected one of the wavelengths is taken out of the monochromator.

Figure 2B:
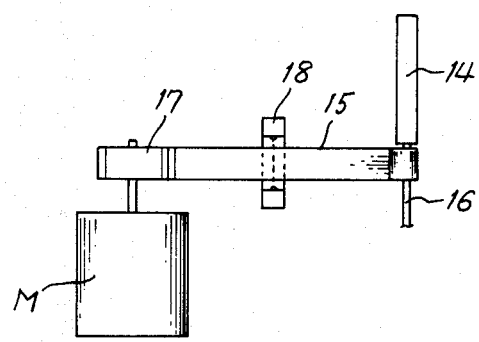
Figure 2A:
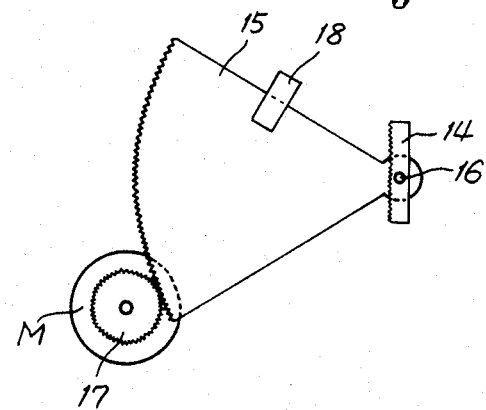
FIG. 2a is a somewhat schematic top plan view of the wavelength driving mechanism in the system of FIG. 1.
Figure 3:
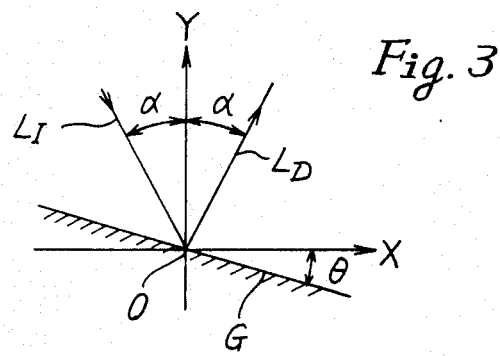
FIG. 3 is a drawing for explaining the calculation of the wavelength of the diffracted light from the diffraction grating in FIG. 1.

Referring to FIGS. 2a and 2b there is shown a sector gear 15 rotatable about an axis 16, and the diffraction grating 14 is mounted on the sector gear 15 with its axis coinciding with the axis 16 of the sector gear 15 for simultaneous rotation therewith. A pinion gear 17 meshes with the sector gear 15 and is driven directly by the pulse motor M. A photodetector 18 for detecting the wavelength origin is provided adjacent one side edge of the sector gear 15 so that when the diffraction grating 14 takes a position coinciding with the X axis of the coordinate system in FIG. 3, the photodetector 18 detects the side edge of the sector gear 15.

Referring to FIG. 1, the sample cell 12 contains a sample to be analyzed. The monochromatic light of a selected wavelength passes through the sample so as to be detected by the photodetector 13, which produces an output electrical signal in accordance with the intensity of the detected light.

The output from the photodetector 13 is amplified by a preamplifier 19 and applied through an A/D converter 20 to a computer 21, which processes the data obtained by the measurement and at the same time controls the operation of the instrument. A display unit 22 indicates the result of the measurement.

The computer 21 applies a signal in the form of pulses to a pulse motor driving circuit 23 to drive the pulse motor M for wavelength scanning of the monochromator. At the same time the pulses, which corresponds to the amount $\phi$ of rotation of the motor in the previously given expression (1), are counted, so that the computer 21 calculates from the counted number of the pulses the wavelength $\lambda$ of the monochromatic light emerging from the monochromator in accordance with the expression (1).

For the calculation the grating pitch N is required as a parameter as shown in the expression. This parameter is input as three-bit data into the computer 21 through an input unit 24. In the illustrated embodiment, the input unit 24 includes three switches S1, S2 and S3 the stationary contacts of which are connected through pull-up resistors r1, r2 and r3, respectively, to a voltage source +V on one hand and to the computer 21 on the other, with the movable contacts of the switches being grounded as at E, so that the high or low level of the voltage at each of the stationary contacts of the switches is read into the computer 21. The switch S1 is provided for designation of addition (a positive sign) or subtraction (a negative sign), and the switches S2 and S3 correspond to numerical values 1 and 2, respectively, so that by combining the on or off condition of the three switches it is possible to set in the input unit seven (7) different values, that is, 0, +1, −1, +2, −2, +3 and −3 to be added to or subtracted from the nominal value N of the grating pitch.

The computer 21 is so designed that when the data set in the input unit 24 is zero (0), the computer calculates the wavelength with the nominal grating pitch as the parameter N in the previously mentioned expression (1), and that when the data set in the input unit is ±n, the computer calculates the wavelength with N±n as the parameter N in the expression (1). Diffraction gratings manufactured with a nominal grating pitch of N grooves or lines per millimeter may actually have a different pitch ranging, say, from N−3 to N+3. Therefore, when a spectrophotometer has been assembled or the diffraction grating has been exchanged for a new one, wavelength calibration is conducted by measuring a known sample for an emission line of a known wavelength on the assumption that the diffraction grating now in use has the nominal pitch, and calculating the actual grating pitch from the difference between the known wavelength of the emission line and the measured wavelength thereof as indicated on the display unit, thereby to determine the parameter to be set in the input unit.

For wavelength calibration the computer 21 operates in the following manner. There are two ways of calibration. In one of them the position of the diffraction grating for the zeroth-order light is first determined and the position thereof corresponding to the 656.1 nm emission line of the light from a deuterium lamp is measured for calibration. In the other method, the positions of the diffraction grating corresponding to the two emission lines of 656.1 nm and 486.0 nm of the light from a deuterium lamp are obtained for calibration.

In the former method, first the position of the diffraction grating is roughly detected by the photodetector 18. Then a range adjacent the zeroth-order light is searched for a peak to determine the exact position of the diffraction grating for the zeroth-order light, and then a range adjacent the wavelength of 656.1 nm is searched for a peak to determine the position of the diffraction grating for the wavelength of 656.1 nm.

From the angle $A\phi$ of rotation of the diffraction grating between the position for the zeroth-order light and that for the 656.1 nm emission line, the actual number N' of the grooves of the diffraction grating is calculated by using the following expression $$N = \frac{2}{\lambda} \cos \alpha \sin A \phi.$$

The result of the calculation is indicated on the display unit 22, and in accordance with the indication, the switches S1–S3 are operated to set in the input unit 24 the necessary data for calibration. After that, each time the apparatus is switched on, it is only necessary to determine the position of the diffraction grating for the zeroth-order light by peak searching. The computer will then reads the on or off conditions of the switches to calculate the wavelength of the monochromatic light now provided by the monochromator.

In the latter method in which the two emission lines of the light from the deuterium lamp are used, after the position of the diffraction grating is roughly detected by the photodetector 18, both the positions of the emission lines of the wavelengths of 656.1 nm and 486.0 nm are determined. In this case, the angles of rotation of the diffraction grating from the position thereof for the zeroth-order light to the positions thereof for the two emission lines can not be obtained, but only the difference angle $\Delta A\phi$ of rotation of the diffraction grating between the positions thereof for the two emission lines can be obtained, so that it is impossible to obtain the actual number N' of the grooves of the diffraction grating from the difference angle $\Delta A\phi$. However, it is possible to calculate beforehand the difference angle $\Delta A\phi$ between the angles of rotation of the diffraction grating for the two emission lines in each of the seven cases of N'=N±1, N'±2, N'=N±3 and N'=N. Therefore, if the difference $\Delta A\phi$ is indicated, it is possible to know the actual number N' and consequently which of the switches are to be on or off, and the switches are operated accordingly. After that, each time the instrument is switched on, it is only necessary to determine the position of the diffraction grating for 656.1 nm emission line. Then the computer reads the conditions of the switches and calculates the wavelength of the light now provided by the monochromator.

In the above embodiment, the wavelength is calculated from the counted number of the pulses applied to the pulse motor. In another embodiment of the invention, there may be provided a read only memory (ROM) which stores a table containing the counted numbers of the pulses applied to the motor and the corresponding wavelengths obtained in each of the cases of N±n (where n=0, 1, 2, 3), so that any one of the wavelength may be selected in accordance with the counted number of the pulses applied to the motor.

If the wavelength origin can be detected by a suitable mechanism with a high degree of accuracy and precision, wavelength calibration can be conducted with only one emission line of a known wavelength.

In accordance with the invention, a high degree of accuracy and precision can be attained in wavelength selection with a relatively simple mechanism for driving the diffraction grating.

What I claim is:

1. A spectrophotometer comprising:
   a light source;
   a monochromator including a diffraction grating and a motor for driving said diffraction grating to provide a beam of monochromatic light at the exit slit of said monochromator;
   a sample cell containing a sample to be analyzed and so disposed that said monochromatic light beam impinges on said sample cell;
   a photodetector for detecting the light from said sample to produce a corresponding electrical signal;
   a data processor for obtaining the wavelength of said monochromatic light from the amount of rotation of said motor in accordance with a predetermined functional relation;
   an input unit for setting a parameter corresponding to the difference between the nominal and actual grating constants of said diffraction grating;
   said data processor being so arranged as to obtain said wavelength in accordance with said nominal grating constant having been modified with said parameter set in said input unit; and
   a display unit for displaying said wavelength.

2. The spectrophotometer of claim 1, wherein said motor is a pulse motor.

3. The spectrophotometer of claim 1, wherein said data processor calculates said wavelength in accordance with $$\lambda = \frac{2}{N} \cos \alpha \sin A \phi$$

where $\lambda$ is said wavelength, N is the nominal number per mm of the grooves ruled on said diffraction grating; $\alpha$ is the angle the light incident on said diffraction grating makes with the normal to said diffraction grating; A is the reduction ratio of said motor; and $\phi$ is the amount of rotation of said motor.

4. The spectrophotometer of claim 1, wherein said data processor includes a ROM which stores a table containing a group of counted numbers of the pulses applied to said motor and the corresponding wavelengths of said monochromatic light for each of a group of different grating constants about the nominal grating constant of said diffraction grating, and said data processor selects one of said wavelengths in accordance with the counted number of the pulses applied to said motor.

5. The spectrophotometer of claim 1, wherein said parameter setting unit comprises a plurality of switches the on and off conditions of which are combined to express a plurality of data to change said parameter, said switches being connected to said data processor so that said data processor reads in said parameter to obtain said wavelength.

* * * * *